United States Patent
Makavy et al.

(10) Patent No.: US 9,237,207 B2
(45) Date of Patent: Jan. 12, 2016

(54) DEVICE, SYSTEM AND METHOD FOR PROVIDING DISTRIBUTED ONLINE SERVICES

(75) Inventors: Ran Makavy, Ramat Efal (IL); Micha Berdichevsky, Tel Aviv (IL); Barak Naveh, Hod Hasharon (IL); Yoav Artzi, Ramat Hasharon (IL)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/226,414

(22) Filed: Sep. 6, 2011

(65) Prior Publication Data

US 2011/0320614 A1  Dec. 29, 2011

Related U.S. Application Data

(62) Division of application No. 12/246,078, filed on Oct. 6, 2008, now Pat. No. 8,213,924.

(51) Int. Cl.
*H04L 29/08* (2006.01)
*H04L 13/16* (2006.01)
*H04L 29/06* (2006.01)
*H04W 4/00* (2009.01)

(52) U.S. Cl.
CPC ........... *H04L 67/36* (2013.01); *H04L 13/16* (2013.01); *H04L 67/04* (2013.01); *H04L 67/14* (2013.01); *H04L 67/34* (2013.01); *H04L 69/24* (2013.01); *H04W 4/00* (2013.01)

(58) Field of Classification Search
CPC . H04L 12/5695; H04L 41/0893; H04L 43/16; H04L 67/14; G06F 2201/86
USPC .................. 709/203, 218, 219, 227, 230, 237
See application file for complete search history.

(56) References Cited

U.S. PATENT DOCUMENTS

| | | | |
|---|---|---|---|
| 6,363,249 B1 | 3/2002 | Nordeman et al. | |
| 7,221,901 B2 | 5/2007 | Watanabe | |
| 7,266,588 B2 | 9/2007 | Oku | |
| 2002/0032751 A1 | 3/2002 | Bharadwaj | |
| 2002/0111995 A1 | 8/2002 | Mansour et al. | |
| 2004/0243714 A1 | 12/2004 | Wynn et al. | |
| 2006/0031520 A1* | 2/2006 | Bedekar | H04L 67/1027 709/227 |
| 2006/0031524 A1* | 2/2006 | Freimuth | H04L 49/90 709/227 |
| 2007/0150303 A1* | 6/2007 | Cheenath | H04L 29/06 709/203 |

(Continued)

FOREIGN PATENT DOCUMENTS

| | | |
|---|---|---|
| RU | 2295762 C2 | 3/2007 |
| WO | WO-2006/094296 A1 | 9/2006 |

OTHER PUBLICATIONS

European Patent Office, Extended European Search Report, European Patent Application No. 09818875.8, Jul. 12, 2012, 14 pages.

(Continued)

*Primary Examiner* — Barbara Burgess
(74) *Attorney, Agent, or Firm* — Fenwick & West LLP (57) ABSTRACT

A device, system, and method is provided for running mobile applications, including a server for running applications and a client installed in a mobile device. The client may connect to the server via a network. The client may display content, receive user input, and send user input to the server. The server may use the client to receive user input and to display content for running applications for the mobile device.

14 Claims, 7 Drawing Sheets

(56) References Cited

U.S. PATENT DOCUMENTS

| | | | |
|---|---|---|---|
| 2008/0022005 A1* | 1/2008 | Wu | H04L 65/80 709/231 |
| 2008/0075049 A1 | 3/2008 | Xie | |
| 2008/0114882 A1* | 5/2008 | Christenson | H04L 69/162 709/228 |
| 2009/0125632 A1* | 5/2009 | Purpura | H04L 63/10 709/229 |

OTHER PUBLICATIONS

European Patent Office, Examination Report, European Patent Application No. 09818875.8, Aug. 8, 2013, six pages.

Russian Patent and Trademark Agency, Office Action, Russian Patent Application No. 2011116683, Aug. 28, 2013, six pages.

Russian Patent and Trademark Agency, Office Action, Russian Patent Application No. 2011116683, Jan. 30, 2014, ten pages.

* cited by examiner

DEVICE, SYSTEM AND METHOD FOR PROVIDING DISTRIBUTED ONLINE SERVICES

FIELD OF THE INVENTION

The present invention relates to mobile devices. The present invention also relates to porting. In particular, the present invention relates to adapting information services, software or code to conform to individual device parameters for proper viewing on and operation from the mobile device.

BACKGROUND

Mobile devices come in thousands of hardware and software varieties having different operating systems, screen resolutions, input controls, etc. To accommodate the technological diversity in mobile devices, it is a goal of content and information service providers to provide users with universal support for all mobile devices without compromising appearance and functionality.

One way to provide universal support is porting. Porting is a process in which software or code is adapted to conform to a computing environment different from that for which the software was originally designed. For example, to display website code on a screen of a mobile device having a different browser than that for which the code was written, the website code may be altered to comport with the requirements and capabilities of the different browser. Multiple versions of a service solution must be generated with variations to match the specific hardware and software combinations that exist on the target mobile devices.

One of the main disadvantages of porting is that it is time consuming and costly. In one example, a porting process includes running and testing the same code individually on each mobile device, identifying problematic portions of the code, re-writing code to fix the problematic portions, and reiterating tests with the re-written code.

To improve efficiency, another porting process was designed. In this process, a first layer of software is generated having content/data universally intended for all mobile devices. Additional device-specific layers of software are also generated for running the first content layer on each specific mobile device. In this example, since the content and device-specific layers are generated separately, the content of the first layer may change without having to adapt the device-specific layers to conform therewith. Thus, a single device-specific layer may support a variety of content for each mobile device. Although improved, this process still yields detriments. For example, the device-specific layers are typically generated automatically based on device parameters stored in a database. Thus, no device-specific layer may exist for a device whose parameters are unknown or not stored in the database. Thus, an unknown mobile device cannot display the content layer.

In order to solve this problem, a generic or default device layer may be used to display the content layer. Since some devices support more advanced capabilities (e.g., using Adobe Flash® objects), while others only support the most basic content (e.g., using hypertext markup language (HTML)), a generic layer compatible for both devices must use the lowest common denominator of function. Thus, the devices capable of supporting advanced content may be forced to display the basic content operating below their potential function. The basic content typically has out-of-date features which reduce the quality of the user experience.

Currently, using as default the lowest common denominator of function is a common solution for providing universal service in the technologically diverse world of mobile devices. For example, online service providers use wireless application protocol (WAP) websites, which essentially are adaptations of their regular websites with reduced, cut-down versions, of content, features, and functionality. In order to take advantage of advanced capabilities, parallel versions of the service must be developed, checked and maintained, each taking into account the additional capabilities unsupported by inferior mediums.

A need exists to provide universal support for a wide variety of mobile devices without degrading the quality of service.

SUMMARY OF THE INVENTION

In an embodiment of the invention, a device, system, and method are presented for running mobile applications, including a server for running applications and a client installed in a mobile device. The client may connect to the server via a network. The client may display content, receive user input, and send user input to the server. The server may use the client to receive user input and to display content for running applications for the mobile device.

In an embodiment of the invention, a device, system, and method are presented for distributing cache management. A cache may be operated by a client and located in a mobile device for storing data locally. A server may be connected to the mobile device via a network. The server may provide additional resources for managing data stored locally in the mobile device to supplement the resources of the mobile device.

In an embodiment of the invention, a device, system, and method are presented for communicating using a hypertext transfer protocol. The system may include a server for communicating with one or more clients and a client installed in a mobile device. The client may connect to the server via a network using a hypertext transfer protocol. The client may open a new connection and send a request if no connection is currently open so that the server can always send data. The client may open additional connections to send data to the server without waiting for a response a previous connection.

In an embodiment of the invention, a device, system, and method are presented for determining whether or not a client can have two or more simultaneous connections using a hypertext transfer protocol. The system may include a server for communicating with one or more clients and a client installed in a mobile device. The client may connect to the server via a network using a hypertext transfer protocol. The client may open a first connection, initiate a timer count, and open a concurrent second connection. The server may receive the first connection, and respond to the first connection only after the second connection is opened. The client may check the timer count at the time of receiving the response to the first connection. If the timer count exceeds a predefined threshold, the client may determine that two or more concurrent connections cannot be supported.

BRIEF DESCRIPTION OF THE DRAWINGS

Embodiments of the invention will be understood and appreciated more fully from the following detailed description in conjunction with the figures, which are not to scale, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer processor, a computer, or computing system, or a similar electronic computing device, that manipulates and/or transforms data represented as physical, such as electronic, quantities within the computing system's registers and/or memories into other data similarly represented as physical quantities within the computing system's memories, registers or other such information storage, or display devices. Further, "plurality" may be used throughout the specification to describe two or more components, devices, elements, parameters and the like.

Figure 1:
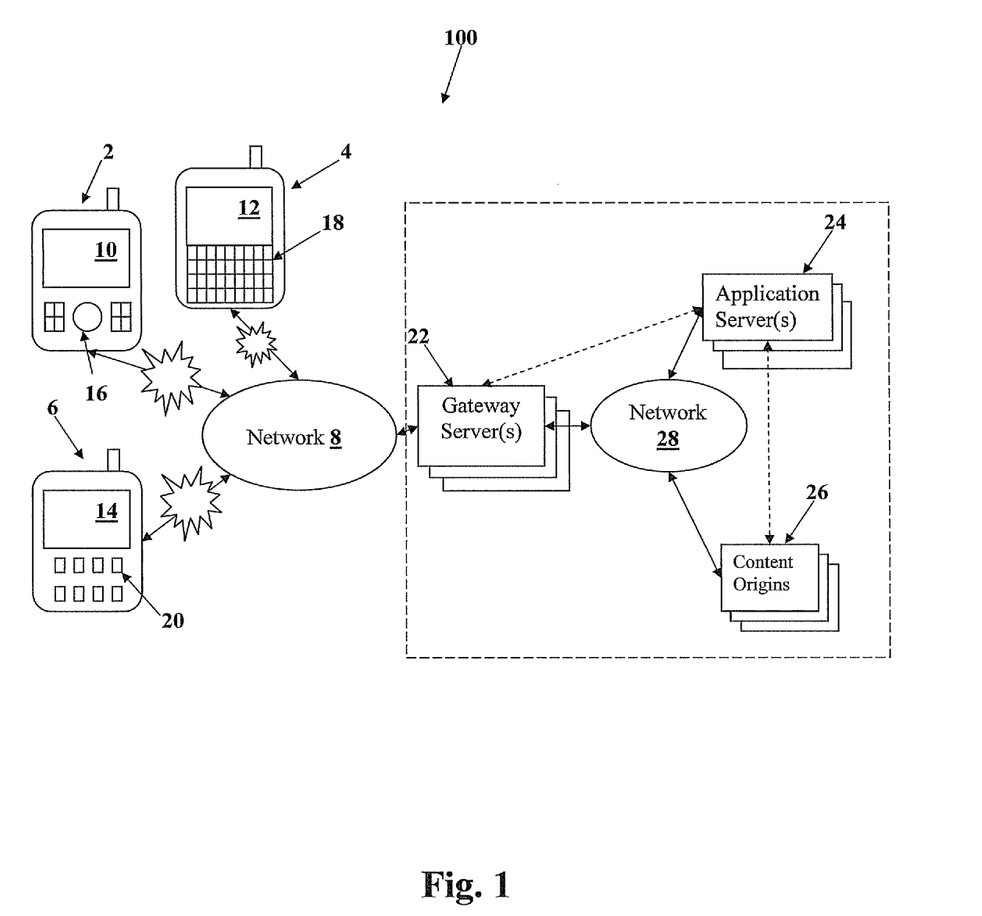
FIG. 1 is a schematic illustration of a system having a plurality of mobile devices operating over a network according to an embodiment of the invention.

Reference is made to FIG. 1, which schematically illustrates a system 100 having a plurality of mobile devices 2, 4, and 6 operating over a network 8 according to an embodiment of the invention. System 100 may include a gateway server 22, an application server 24 and a content origin server 26.

Network 8 may be any wireless or wired network connecting mobile communication devices to servers over communication protocols, for example, the Internet.

Mobile devices 2, 4, and 6 may be any wireless hand-held computing device or installed, e.g., in a car or the like, including, for example, cellular telephones, smart phones, mobile computers such as personal digital assistants (PDAs), portable game consoles, media players/recorders, navigation devices for example supporting a global positioning system (GPS), etc. Mobile devices 2, 4, and 6 include display screens 10, 12, and 14, respectively, e.g., for displaying a user interface. Mobile devices 2, 4, and 6 may include audio output devices such as speakers for providing sound data to a user. Mobile devices 2, 4, and 6 include input devices, 16, 18, and 20, respectively e.g., for receiving input from a user (e.g., via keys, touch screen, click-wheel, recorder/microphone, other input means). Additional input/output devices (e.g., mouse or keyboard, microphone, headset, etc.) may connect to mobile devices 2, 4, and 6, e.g., via a wireless connection or a wired connection such as an in/out jack or a universal serial bus (USB) connector. Mobile devices 2, 4, and 6 may use any of a wide variety of operating systems (OSs), which are known.

Gateway server 22 may be a contact point between each of mobile devices 2, 4, and 6, and application server 24. Gateway server 22 may manage communication protocols.

Application server 24 is a server that has logic for running an application or service. Application server 24 may be a contact point for devices in system 100 to access content origin server 26.

Content origin server 26 is a server, e.g., a web server, having a database or other source of data/content, which may be accessible over network 8. For example, content origin server 26 may be a weather, news, or movie hub from which weather, news, and movies, respectively, may be accessible via mobile devices 2, 4, and 6. Server 26 may be any online data service, such as, for example, a financial service, social network, messaging service, digital store, music catalogue, etc. For the purposes of this invention, content may include any type and sort of information and data, including but not limited to media content (e.g. images, movies, music, time, location, inventory, availability, search results, online service etc.).

It may be appreciated that any of servers 22, 24, and/or 26 may be combined as a single server, and that each of servers 22, 24, and/or 26 may be separated into multiple servers. In a more likely variation, gateway server 22 and application server 24 are combined to form a single server. In addition, each of servers 22, 24, and/or 26 may only form a part of a server.

Mobile devices 2, 4, and/or 6 may communicate and interact with gateway server 22 for obtaining access to content provided by the content origin server 26 or gaining access to services operated by content origin server 26.

Mobile devices 2, 4, and/or 6 may send their respective device parameters to gateway server 22. Device parameters may be sent together with or separate from the content requests. In one embodiment, device parameters need only to be sent once, e.g., the first time mobile device 2, 4, and/or 6 requests content from gateway server 22. Device parameters may include, e.g., screen resolution, software or programs installed on the device, OSs running on the device, available memory, available libraries, available input/output devices such as speakers or a liquid crystal display (LCD) screen, a correspondence of user controls on the device (e.g., keyboard keys, location on a touch screen, rotation or location of a click-wheel, etc.) and command signals executed thereby. The parameters may be stored in gateway server 22, e.g., in a cache or main memory thereof.

In response to the request from mobile devices 2, 4, and/or 6 to gateway server 22 for content, gateway server 22 may, in turn, send a request for the content to application server 24. Application server 24 may, in turn, send a request for the content to content origin server 26.

In response to the request, content origin server 26 may send application server 24 the requested content. The content may be requested and/or provided via, e.g., standard web protocols, application programming interface (API), or any other known technique.

Application server 24 may receive the content. Application server 24 may process the content received from content origin server 26 to determine if the received content matches the request for content from gateway server 22 (e.g., the request originating from one or more of mobile devices 2, 4, and/or 6). If the content matches the request, application server 24 formats the content according to pre-defined parameters appropriate for gateway server 22 which may be independent of mobile devices 2, 4, and 6 parameters. Application server 24 transmits the formatted content to gateway server 22.

Gateway server 22 receives the formatted content and processes the content to check again if the received content matches the original request for content from one or more of mobile devices 2, 4, and/or 6. If it is re-validated that the content matches the request, gateway server 22 may retrieve (e.g., from cache memory) the respective device parameters of each of mobile device 2, 4, and/or 6 requesting the content. Gateway server 22 may format the content according to the device parameters of each of mobile device 2, 4, and/or 6. Gateway server 22 may encode and send the device specific formatted content to mobile device 2, 4, and/or 6.

Gateway server 22 may communicate with mobile device 2, 4, and/or 6 using a client-server protocol. In this protocol, a client is installed on each of mobile devices 2, 4, and/or 6. The client may include software installed or code which runs on each of mobile devices 2, 4, and/or 6 for accessing remote gateway server 22 via network 8.

The client in each of mobile device 2, 4, and/or 6 receives the respective device-specific formatted content from gateway server 22. Content may include any sort of data, including but not limited to text, images, audio, video, game moves and logic, actions, information, experiences that may provide value for an end-user, vector graphic elements, user interface and elements thereof, interactive elements and so forth. The client may report device parameters for each of a plurality of different mobile devices 2, 4, and/or 6 and gateway server 22 and/or application server 24 applies an algorithm to automatically convert a generic user interface to a device-specific user interface according to the device parameters for each of the plurality of different mobile devices 2, 4, and/or 6.

The client in mobile device 2, 4, and/or 6 may display the data on displays 10, 12, and/or 14, respectively, using a user interface engine. Alternatively, when the content includes audio data, the client plays the data through the appropriate output speaker. In addition, gateway server 22 and/or certain content may invoke other resources from mobile device 2, 4, and/or 6 to perform specific actions, such as, e.g., play video files using a native player, make a call, send a short message, get a geo-location, use a camera, etc.

In parallel, the client in each of mobile device 2, 4, and/or 6 accepts input from the user via user controls on the device (e.g., key strokes, pointing device movements on a touch screen, rotation of a click-wheel, etc.). The client may handle some input locally, e.g., using an event handler, which translates the user input to execute operations corresponding thereto. The client may send other input to gateway server 22 for handling.

Gateway server 22 may identify, in the device parameters, a correspondence of user controls on the device and operations caused thereby. If the operations corresponding to the user input do not require new content (e.g., highlighting a word on user displays 10, 12, and/or 14, returning to a previous page whose content is still stored in the cache memory of gateway server 22, etc.), gateway server 22 may execute the operations. If the operations corresponding to the user input do require new content, gateway server 22 may forward the operation request for new content to application server 24 to retrieve the new content.

Application server 24 may likewise determine if the operation request requires new content. If the operation request does not require new content, application server 24 may handle the operation and send updated content to gateway server 22 for use on mobile devices 2, 4, and/or 6. If the operation request does require new content, application server 24 may send a request for the new content to the content origin server 26. Content origin server 26 may fetch or update the requested content. The content origin server 26 may send the new content to application server 24, which may in turn send the content to gateway server 22, which may in turn send the content to mobile device 2, 4, and/or 6, via the respective local clients installed therein.

It may be appreciated that although servers 22, 24, and/or 26 are separate from each other in the figure, in an alternate embodiment, any of servers 22, 24, and/or 26 may be integrated as a single server. In a preferred embodiment, at least servers 22 and 24 are separate to enable better scalability and reduce latency of transactions. Furthermore, multiple servers 22 and/or multiple servers 24 may be used, e.g., to support increasing volume of transactions, mobile devices and communications with server 26. When servers 22, 24, and/or 26 are separate from each other, communication there between may be transmitted as wireless or wired signals, e.g., over a network 28 (e.g., the same or different as network 8). In another embodiment (not shown), when servers 22, 24, and/or 26 are integrated, e.g., as parts of a single server, communication there between may be sent between processes or in process without the use of a network. Other or additional configurations or combinations of servers may be used.

The identity and/or security of any of the servers may be checked and verified at any stage of this communication sequence.

The conventional porting processes using layers, described above in the Background section, generates device-specific layers for viewing content for each different device having information stored in a database. One detriment of this porting process is that the device-specific layers are generated for every device or profile stored in a database, irrespective of whether or not the device is active or ever requests to view the content layer. According to embodiments of the invention, porting for a device begins when the device requests to view the content. Therefore the porting process is executed under a need-only basis, only for devices that request to view the content. Another detriment of the aforementioned conventional porting process is that content is only viewable by devices having parameters previously stored in the database. Thus, a new, unknown, or unrecognized device cannot have a device-specific layer and must view content with generic appearance and functionality using a default layer. In contrast, according to embodiments of the invention, the porting layer for a device is not generated from device parameters stored in a database, but from information sent by the device itself. Thus, porting is achieved for devices whose parameters are not stored in the database (e.g., new, foreign, unknown devices). Other or additional benefits may be achieved.

Figure 2A:
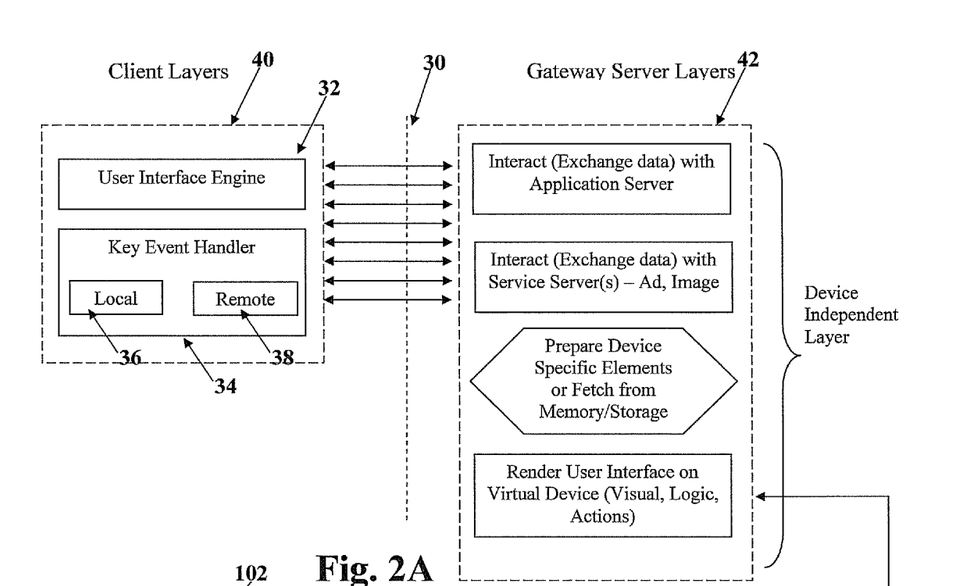
FIG. 2A is a flow chart of a porting process according to an embodiment of the invention.

Reference is made to FIG. 2A, which is a schematic illustration of layers in a mobile device (e.g., one of mobile devices 2, 4, and/or 6 of FIG. 1) and a gateway server (e.g., gateway server 22 of FIG. 1) interacting to execute a porting process according to an embodiment of the invention.

The gateway server and the mobile device may communicate using one or more gateway server layers 42 and one or more client layers 40, respectively. The device layers of the client side and the gateway server side are separated by dashed-line 30 in the figure.

Client layers 40 may include at least a user interface engine 32 and an event handler 34. User interface engine 32 may display content on the mobile device. Event handler 34 may translate user input via device controls to execute corresponding operations. Event handler 34 may include a local operator 36 and a remote operator 38. Local operator 36 typically handles user input locally in the mobile device, while remote operator 38 may send user input to the gateway server for handling.

Gateway server layers 42 may be a contact point for the mobile device in a network (e.g., network 8 of FIG. 1). Gateway server layers 42 may create a client-server protocol to comport with a mobile device having any arbitrary device parameters. Gateway server layers 42 may simulate a "virtual" device 84 corresponding to the mobile device. A "virtual" device may be a set of data structures and/or operations in the gateway server which acts as a mobile device and is configured according to some or all of the device parameters of the corresponding mobile device. Gateway server layers 42 may then adapt content and commands to comport with the parameters for virtual device 84. Gateway server layers 42 may send the device specific adapted content to client layers 40.

Client layers 40 may receive the adapted content, and using user interface engine 32 may display the device specific content on the mobile device and enable specific functional capabilities in accordance with instructions provided by the gateway server layers 42.

Gateway server layers 42 may configure virtual device 84 automatically (or semi-automatically). In this way when configuration detection is not device dependent, since the virtual device is not device dependent and the client is not device dependent, the whole system becomes device independent.

In one embodiment of the present invention, a system for running mobile applications may include application server 24 for running applications (e.g., and/or gateway server 22) and a client installed in mobile devices 2, 4, and/or 6. The client may connect to application server 24 via network 8 and/or 28. The client may display content, receive user input, and send user input to application server 24. Application server 24 (e.g., and/or gateway server 22) may use the client to receive user input and to display content for running applications for mobile devices 2, 4, and/or 6. There may be a plurality of clients, each of which may be adapted to be installed in a plurality of different mobile devices 2, 4, and/or 6 that have at least a common device parameter. The same or duplicate client may be used for at least two of the plurality of different mobile devices 2, 4, and/or 6.

Figure 2B:
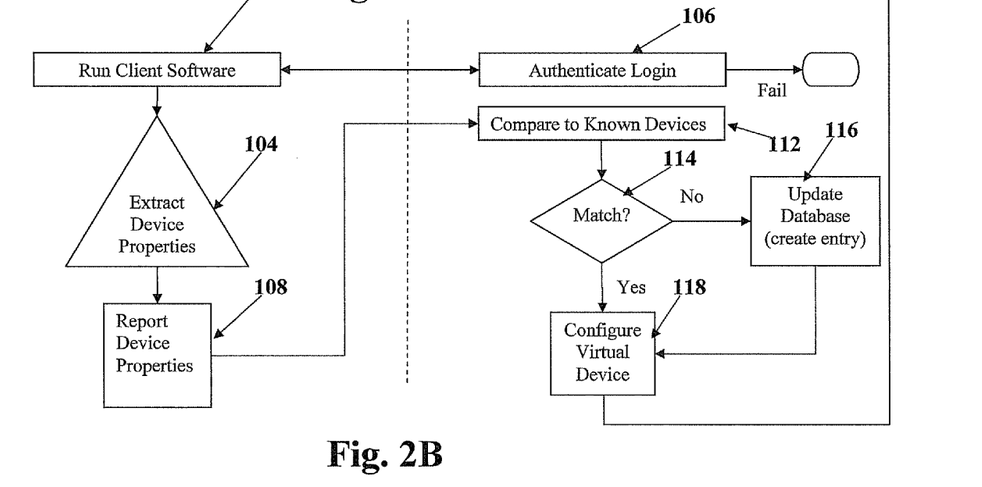
FIG. 2B is a schematic illustration of layers in a mobile device and a gateway server interacting to execute the porting process of FIG. 2A according to an embodiment of the invention.

Reference is made to FIG. 2B, which is a flow chart of a porting process executed by the interacting layers of the mobile device and the gateway server of FIG. 2A according to an embodiment of the invention. The porting process may automatically configure content from a remote server (e.g., content origin server 26 of FIG. 1) to comport with the parameters of a device (e.g., each of mobile devices 2, 4, and/or 6 of FIG. 1) for displaying the content on the device and enable device specific capabilities.

In operation 102, client layers 40 may run client software on a mobile device.

In operation 104, client layers 40 may extract device parameters or certain parameters from the mobile device. The device parameters may be properties of the device, e.g., screen resolution, software installed on the device, available memory, OS, a correspondence of user controls on the device (e.g., keyboard keys, location on a touch screen, rotation or location of a click-wheel, etc.) and command signals executed thereby.

In operation 106, client layers 40 may connect to gateway server layers 42. Client layers 40 may login to gateway server layers 42. For example, client layers 40 may send authenticate or an identifier, such as, a password, code, or encrypted key. Client layers 40 and gateway server layers 42 may agree on and use a communication protocol (e.g., such as a hypertext transfer protocol (HTTP) implementation). If the login fails, no connection between client layers 40 and gateway server layers 42 is made. If the login fails, client layers 40 may repeat operation 106 until either a connection is made or the number of attempts exceeds a predetermined threshold.

In operation 108, client layers 40 may send gateway server layers 42 the device parameters for the mobile device. In one embodiment, instead of directly sending the device parameters, client layers 40 send gateway server layers 42 a device identifier, e.g., user-agent information or a device signature. In one embodiment, gateway server layers 42 may request or prompt the device parameters from client layers 40.

Figure 3:
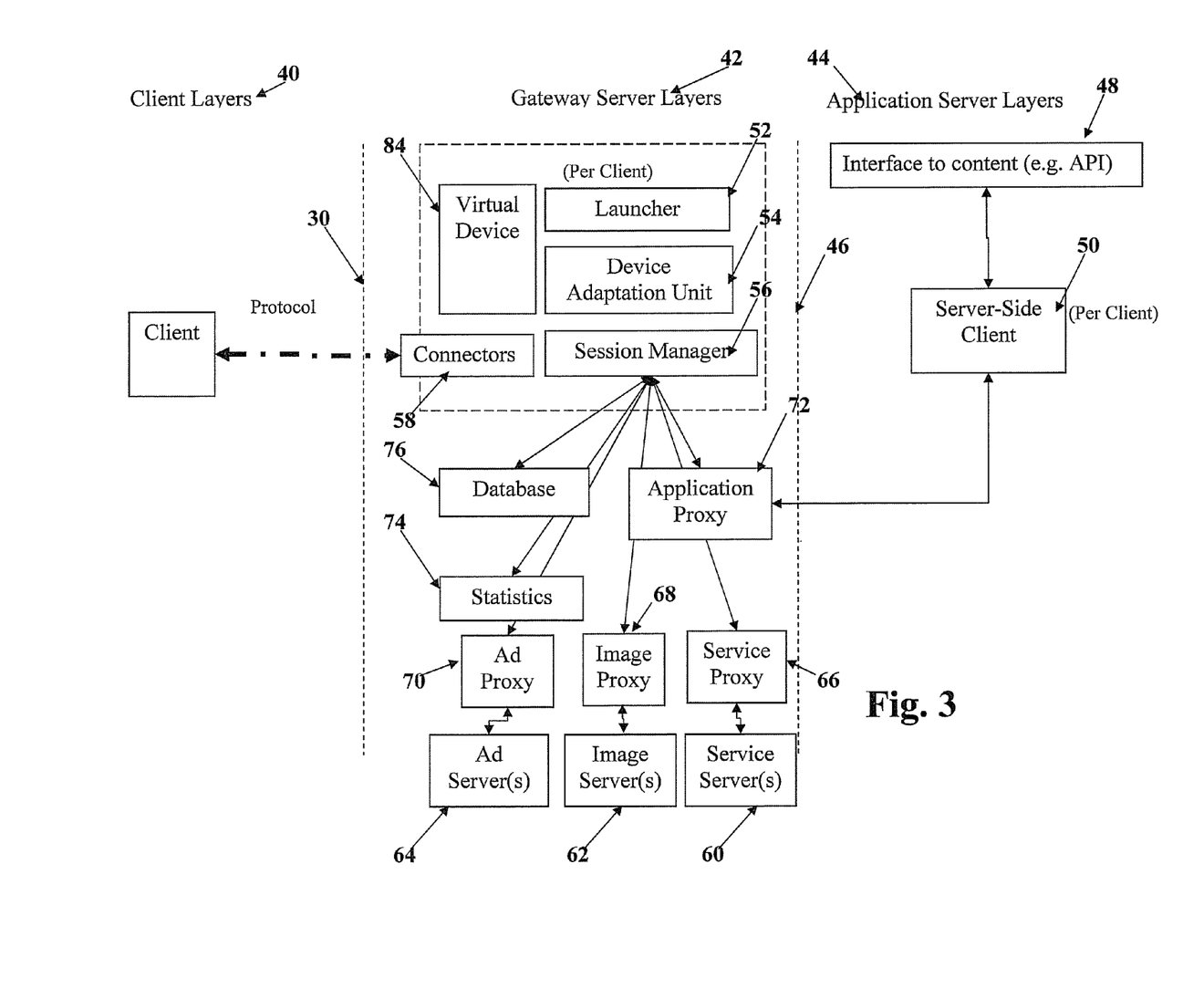
FIG. 3 is a schematic illustration of layers in a mobile device, a gateway server, and an application server for providing applications(s) to a client of the mobile device according to an embodiment of the invention.

Gateway server layers 42 may process the device parameters and determine if they are sufficient to generate a virtual device (e.g., virtual device 84 of FIG. 3). If gateway server layers 42 need more information to generate a virtual device, gateway server layers 42 may request the remaining information from client layers 40 (e.g., such as version of software, available libraries, etc.). In some embodiments, gateway server layers 42 may ask client layers 40 to perform certain tests on the mobile device to obtain the remaining information to report to gateway server layers 42. For example, gateway server layers 42 may ask client layers 40 to decode certain media type(s), process calculation and report the duration of the calculations, or test for a known bug or error in a program. Gateway server layers 42 may use the test results of operation 108 to configure an algorithm to automatically convert a generic user interface to a device-specific user interface according to the device parameters for each of the plurality of different mobile devices.

Gateway server layers 42 may repeatedly request information from client layers 40 for the parameters of the mobile device in which the client is installed, until gateway server layers 42 have sufficient information to generate a virtual device corresponding to the mobile device.

In operations 112-118, gateway server layers 42 may automatically generate/update a device configuration database to store in memory partial or complete data for virtual devices profiles corresponding to mobile devices.

In operations 112, gateway server layers 42 may compare the device identifier (e.g., user-agent information or a device signature) provided in operation 108 or in another earlier operation (e.g., during a download or installation process), to those stored in the device configuration database.

In operations 114, gateway server layers 42 may determine if the device identifier matches a device identifier stored in the device configuration database. If the device identifier does match, gateway server layers 42 may simply retrieve from memory or storage the partial or complete virtual device profile data corresponding to the matching device identifier and proceed to operation 118.

In operations 116, if the device identifier does not match, gateway server layers 42 may update the device configuration database, creating a new entry for the unmatched device identifier including new partial or complete virtual device data corresponding thereto. The process may then proceed to operation 118.

In operation 118, using the partial or complete virtual device data stored in the device configuration database, gateway server layers 42 may generate a complete virtual device corresponding to the mobile device in which the current client is installed.

During operation of the mobile device, client layers 40 may obtain additional information about the mobile device (e.g., such as a HTTP implementation). Client layers 40 may report the additional information to gateway server layers 42. Gateway server layers 42 may in turn automatically update the device configuration database with the new information for the mobile device and/or the virtual device corresponding thereto.

In an alternative embodiment, instead of using a generic client universally installed in all mobile devices and then generating a virtual device specific to each different mobile device, gateway server layers 42 may automatically generate a device-specific client for each different mobile device. The device-specific client may be pre-configured for the specific mobile communication device parameters. In this embodiment, a generic client may first be installed in the mobile devices to test the mobile devices and collect device specific information corresponding thereto. After the testing phase ends and sufficient information for generating a device-specific client has been collected and reported to gateway server layers 42, gateway server layers 42 may use information to replace/update the generic client with the device-specific client.

In one embodiment, client layers 40 may display a prompt (e.g., on displays 10, 12, and/or 14 of FIG. 1) of the mobile device (e.g., mobile devices 2, 4, and/or 6 of FIG. 1, respectively) requesting information from a user. A user may provide information to the client (e.g., using input devices, 16, 18, and 20, respectively), such as clicking a specific key or answering a question regarding which items are visible on the device display. The client may report the data provided by the user to gateway server layers 42 to update the device configuration database.

The virtual device may be configured in gateway server layers 42 as, a set of data structures and/or operations in the gateway server which acts as a mobile device.

Client layers 40 may include user interface engine 32 (e.g., a universal or device-independent object) and an event handler 34 (e.g., a key event handler to handle device-specific key commands). Event handler 34 of client layers 40 may report an event to gateway server layers 42. Events may originate by user controls, such as keys, touch screen, or a camera, or by external sources such as software. Gateway server layers 42 may remotely provide client layers 40 with instructions for responding to the event. Alternatively, event handler 34 may have logic for responding to the event locally. In this example, client layers 40 need not wait for remote instructions from gateway server layers 42. Gateway server layers 42 may send user interface engine 32 and event handler 34 information and commands that are specifically configured for the operating mobile device. Content and information received from application server 24 is likewise configured according to the parameters of the virtual device and then sent to client layers 40. Since gateway server layers 42 send client layers 40 information already configured to the individual capabilities of the operating mobile device, client layers 40 need not be aware of the device specific capabilities. Therefore, substantially the same or "universal" client layers 40 may be installed on all mobile devices or groups of similar devices (e.g., having the same operating system). Since client layers 40 does not use most, or in certain cases, any specific properties, specifications, or parameters of the mobile device on which it is installed, the client may be referred to as a "device-independent" client.

In some embodiments, gateway server layers 42 may request content from additional sources (e.g., other than content origin server 26 of FIG. 1). Gateway server layers 42 may request content, for example, from service servers (e.g., such as image transcoding server(s) or advertisement serving server(s)). Gateway server layers 42 may send the service server adaptation parameters based on the device parameters in accordance with the virtual device based on the respective mobile device parameters to adapt the content at the service server. Alternatively, the adaptation may be performed by gateway server layers 42. Gateway server layers 42 may map the information received from client layers 40 to a format and structure understood by application server 24.

Reference is made to FIG. 3, which is a schematic illustration of layers in a system which includes mobile device(s), a gateway server, and an application server for running a distributed information service accessible from a mobile device according to an embodiment of the invention.

Mobile devices 2, 4, and/or 6, gateway server 22, and application server 24 of FIG. 1 may communicate with each other using client layers 40, gateway server layers 42, and application server layers 44, respectively. In FIG. 3, client layers 40 and gateway server layers 42 are separated by dashed-line 30 and gateway server layers 42 and application server layers 44 are separated by dashed-line 46. Client layers 40 and gateway server layers 42 may correspond to the respective same numbered components in FIG. 2A.

Gateway server layers 42 may include a launcher 52, a device adaptation module 54, a session manager 56, and connectors 58. Launcher 52 determines the identity of a client logging-in and the corresponding mobile device. Launcher 52 may determine the parameters of the mobile device, e.g., obtained through tests run on the mobile device by the client and/or based on device parameters reported by the client or retrieved by gateway server layers 42 from a device configuration database. Gateway server layers 42 may automatically generate/update a device configuration database to store data in memory to support for a virtual device 84 corresponding to client layers 40. Gateway server layers 42 may also include an external central processing unit (CPU), and supplement storage and communication paths over a network. Other or additional functionality and logic may be used.

Application server layers 44 may include server-side client(s) 50 which may be adapted to run application(s) accessible and/or controllable through client layers 40. Server-side client 50 may be device-independent (e.g., universal or not specific to the mobile device in which client layers 40 operate). Server-side client 50 may run application(s), exchange information with a content origin, perform calculations, monitor external events, etc., each associated with the mobile device, but independently of client layers 40. Server-side client 50 may exchange information with e.g., content origin server 26 of FIG. 1, to check periodically for sport match score, emails, etc.

Typically, client layers 40 may report events and/or requests from the mobile device to server-side client 50 through gateway server layers 42, which in turn, via session manager 56, may provide logic for function of client layers 40.

Once the client is logged-in, the client may request content. The client may send the content request via connectors 58 to gateway server layers 42, which in turn may send the request via application proxy 72 to application server layers 44. Application server layers 44 may have installed application code to receive the request from gateway server layers 42. Application server layers 44 may have installed an interface 48 to content, e.g., an API, to retrieve content from a content origins server (e.g., content origin server 26 of FIG. 1) and transfer the content to gateway server layers 42 for rendering and adaptation to virtual device 84. The content may be fetched from a content origin server over a network (e.g., network 28 of FIG. 1) such as the Internet.

Application server layers 44 may then send a request to virtual device 84 to display the retrieved content on a screen thereof or perform a predefined action. The content may then be adapted (e.g., resized, re-formatted, etc.) to comport with the parameters of virtual device 84. Virtual device 84 may have capabilities beyond those of the corresponding mobile device (e.g., to calculate transparencies in images, display file format unsupported by the mobile device, etc.).

The content may include content from multiple sources. Gateway server layers 42, which maintain virtual device 84, may divide the request for content into parts or sub-requests. For example, if the content includes a title and an image, the request for content may be disassembled into a request to fetch and re-size an image from an image server 62, a request to fetch a title from a service server 60, and optionally, a request to fetch an ad from an ad server 64. Gateway server layers 42 may process each sub-requests separately using proxy layers(s) operating in parallel. Gateway server layers 42 may have an image proxy 68 to fetch and re-size the image, a service proxy 66 to fetch the title, and an ad proxy 70 to fetch an ad. Gateway server layers 42 may include a database 76.

Once the content is retrieved by each of the proxy devices, device adaptation unit 54 may adapt the content to comport with device parameters (e.g., device capabilities and user interface) of the mobile device. For example, device adaptation unit 54 performs visual adaptation of content received from application server layers 44, and tailors content elements to the mobile device parameters and capabilities. For example, different mobile devices may represent a set of menu options on a screen differently. For example, a Nokia N73 mobile phone, which has two "soft-keys", may assign a menu option to the left-most soft-key, while a Blackberry Curve™, which has no soft-keys, but does have a native menu key, may assign the menu option to the native menu key.

Device adaptation unit 54 may adapt content based on a specific task (e.g., initiate a call, open a browser, find a global location, etc.). Device adaptation unit 54 may use device specific APIs adapted to perform the specific task. For example, to initiate a call, device adaptation unit 54 may provide client layers 40 with the correct command to access the device personal contact list; to open a browser, device adaptation unit 54 may provide client layers 40 with the correct command to operate the browser that is locally installed on the device; to find global location device, device adaptation unit 54 may provide client layers 40 with the correct command to request device geo-location; etc. Device adaptation unit 54 may adapt the content in a manner that minimizes computational effort, for example, by selecting an image format and/or video format to send, and/or whether or not to perform resource demanding visual effects.

Once the content is adapted to comport with the mobile device parameters, gateway server layers 42 may use statistics 74 associated with the content and the usage thereof to improve caching algorithms to manage the cache. Using the improved caching algorithms, gateway server layers 42 may store a copy of the content in a local cache thereof.

Gateway server layers 42 may then encode the content. Once the content is encoded, gateway server layers 42 may send the content to client layers 40, e.g., via connectors 58, for display on the mobile device.

Client layers 40 may receive and decode the encoded content. Since, by the time the content is sent to the content layers 40, the content is adapted, e.g., formatted to fit the screen of the mobile device, the content layers 40 (e.g., using user interface engine 32 of FIG. 2A), may directly render the content onto the screen of the mobile device without any further alterations. Client layers 40 may report events and handles, e.g., using an event handler (e.g., event handler 34 of FIG. 2A).

Gateway server layers 42 may repeat the process of retrieving and adapting content individually for each of a plurality of mobile devices. Device adaptation unit 54 may adapt content to comport with each set of different device parameters for each mobile device. Gateway server layers 42 may send each different set of adapted content to content layers 40 of the respective mobile devices.

Figure 6:
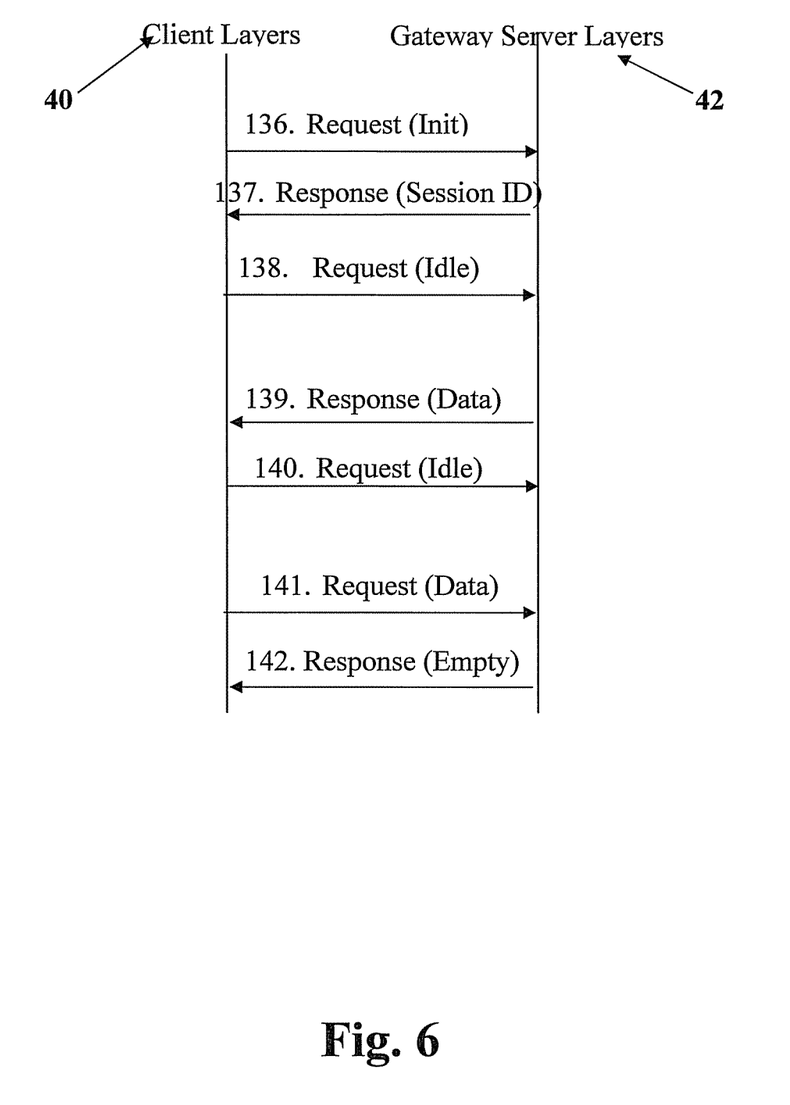
FIG. 6 is a flow chart of signal traffic for communicating between a mobile device and a gateway server according to an embodiment of the invention.
Figure 7:
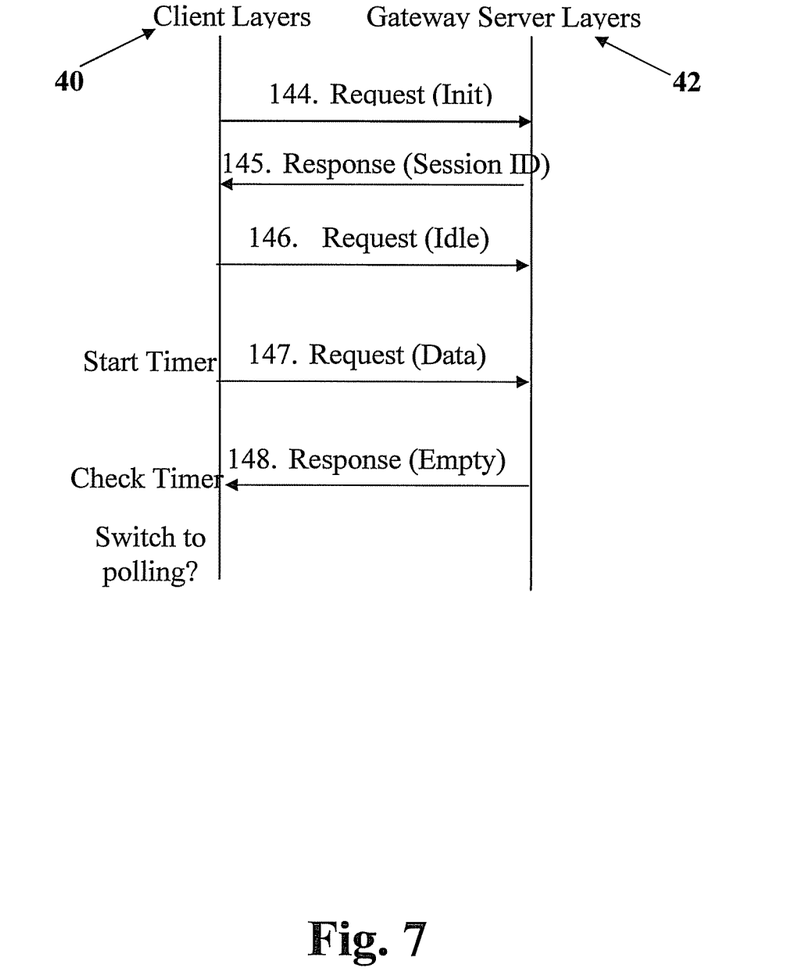
FIG. 7 is a flow chart of a process for detecting if a mobile device can support two or more simultaneous connections with a gateway server according to an embodiment of the invention.

Gateway server layers 42 and client layers 40 communicate using a protocol, e.g., described in further detail in references to FIGS. 6 and 7.

Figure 4:
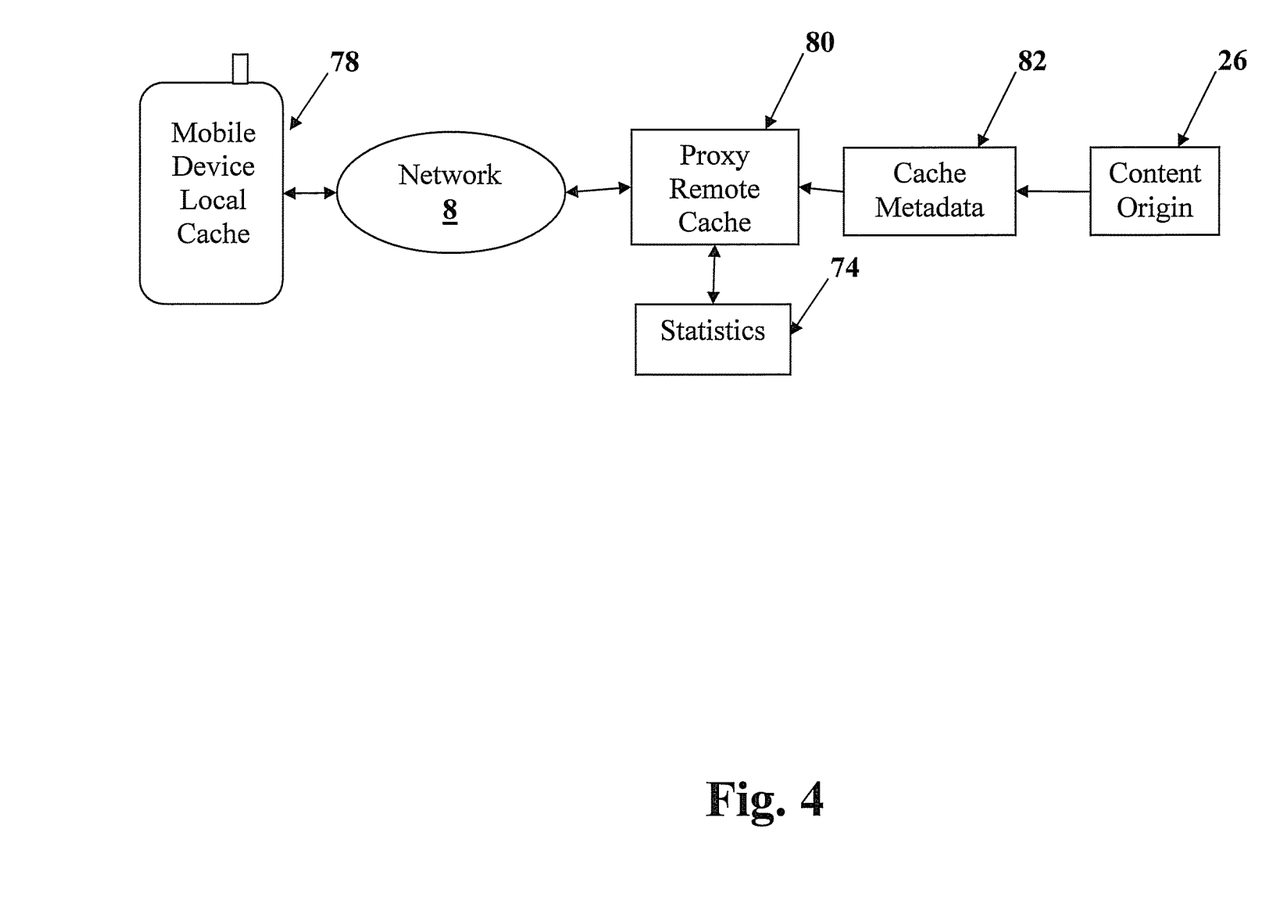
FIG. 4 is a schematic illustration of a plurality of caches for a mobile device distributed in a network according to an embodiment of the invention.

Reference is made to FIG. 4, which is a schematic illustration of a plurality of caches 78 and 80 distributed in a network 8 according to an embodiment of the invention.

In an embodiment of the invention, a device, system, and method are presented for distributing cache management. Local cache memory 78 may be operated by client layer 40 and located in a mobile device (e.g., mobile devices 2, 4, and/or 6 of FIG. 1) for storing data locally. Gateway server 22 of FIG. 1 may be connected to the mobile device via a network (e.g., networks 8 and/or 28 of FIG. 1). Gateway server 22 may remotely manage local cache memory 78. Gateway server 22 may provide additional resources for managing data stored locally in local cache memory 78 of the mobile device to supplement the resources of the mobile device.

A mobile device (e.g., mobile devices 2, 4, and/or 6 of FIG. 1) may include a local cache memory 78. A client installed on the mobile device may operate local cache memory 78. Local cache memory 78 typically has a limited size.

Network 8 (e.g., network 8 of FIG. 1) may include one or more networks to which the mobile device is connected to a gateway server (e.g., via gateway server layers 42 of FIGS. 2A and 3). The mobile device may receive content from the gateway server over network 8 (e.g., using connectors 58 of FIG. 3).

The gateway server may include a proxy remote cache 80, statistics 74, and cache metadata 82. Alternatively, some or all of these components may be separate from the gateway server.

The gateway server may operate proxy remote cache 80. Proxy remote cache 80 may be located in the gateway server. Proxy remote cache 80 may be allocated to assist in the management of local cache memory 78 located in the mobile device. Proxy remote cache 80 may supplement local cache memory 78 of the mobile device. Proxy remote cache 80 may be accessible to the mobile device through network 8.

Statistics 74 (e.g., statistics 74 of FIG. 2) is a storage unit (e.g., a database) of statistical data which correspond to data stored in local cache memory 78. Statistics 74 may also contain metadata, and other data related to the cache, for example, indication whether or not the data is stored persistently on the mobile device.

Cache metadata 82 is a storage unit (e.g., a database) for storing metadata or a means for generating or calculating metadata based on content (e.g., a processor to run an algorithm or another function). Cache metadata 82 may include information about content that may be used to improve cache logic to manage the cache.

Content origin server 26 (e.g., of FIG. 1) includes a server that stores or provides the content requested by the client.

Typically, the available cache resources, network communication paths, and CPU capabilities of a mobile device are relatively weak (e.g., compared to a server, such as the gateway server). Therefore, fetching and processing information locally in the mobile device is relatively more expensive or inefficient (e.g., in terms of data traffic and time) than in the gateway server.

According to embodiments of the present invention, the gateway server supplements the local cache memory 78 with proxy remote cache 80. Proxy remote cache 80 typically has more storage space than local cache memory 78. In addition, the gateway server typically has more processing capabilities than the mobile device, e.g., stronger processing power, more extensive memory resources, statistical databases, and external information such as meta tags, which are known. The gateway server operates proxy remote cache 80 as a copy and mimic of local cache memory 78 of the mobile device. Proxy remote cache 80 may contain part or whole of the data in local cache memory 78. Since the processing capabilities of the gateway server and the storage resources of the proxy remote cache 80 are typically greater than their counterparts in the mobile device, using the gateway server as an external remote cache resource may increase processing capabilities and storage resources of the mobile device.

In one embodiment, the client may send a request for content to be fetched from content origin server 26. Cache metadata 82 may attach relevant cache metadata to the content. Cache metadata may include information to improve logic for storing and/or using the content in a cache memory. Cache metadata 82 may generate the cache metadata, e g, based on a pre-defined database entry or by analysis and processing the content itself. In one example, the metadata may provide a prediction of whether or not the content will change. For example, if the content is a company logo, the content will probably not change frequently. However, if the content is a score in an on-going tennis match, the content will probably change frequently. The metadata may optimize cache resources, e.g., to enable the cache to organize entries according to the respective frequencies in which the entries are updated. The ability to process cache metadata (e.g., via cache metadata 82) to improve cache management is available on the gateway server, but typically not available on the mobile device, e.g., due to limited resources. Thus, using the gateway server to operate proxy remote cache 80 in place of local cache memory 78 provides the additional benefit of cache metadata.

After cache metadata 82 attaches metadata to the content, cache metadata 82 may send the content to proxy remote cache 80. Proxy remote cache 80 may store a copy of the content and may send the content to local cache memory 78.

Statistics 74 may store statistics associated with the content and the usage thereof. Proxy remote cache 80 may use the statistics to enable the use of improved caching algorithms Improving caching algorithms may provide computational benefits otherwise achieved by increasing processing, storage and memory resources. Statistics 74 may store statistics about cache usage over time in local cache memory 78 and/or local cache memories of other clients. Statistics 74 may share the statistics about cache usage for one client with a proxy remote cache for a different client. Thus, one client that has never before used specific content, may have access to statistics associated with the content that were previously generated for another client.

Applying operations based on use of content, metadata, and statistics, each associated with the content may result in recommendations and/or commands sent from gateway server layers 42 to local cache memory 78 to improve cache storage and caching algorithms locally in the mobile device. The client may also receive requests to remove entries from local cache memory 78 that are no longer valid or that are very unlikely to be used again.

The Client may report any updates of activity of local cache memory 78 to the gateway server. The gateway server may update entries or alter activity in proxy remote cache 80 to mimic local cache memory 78.

Figure 5:
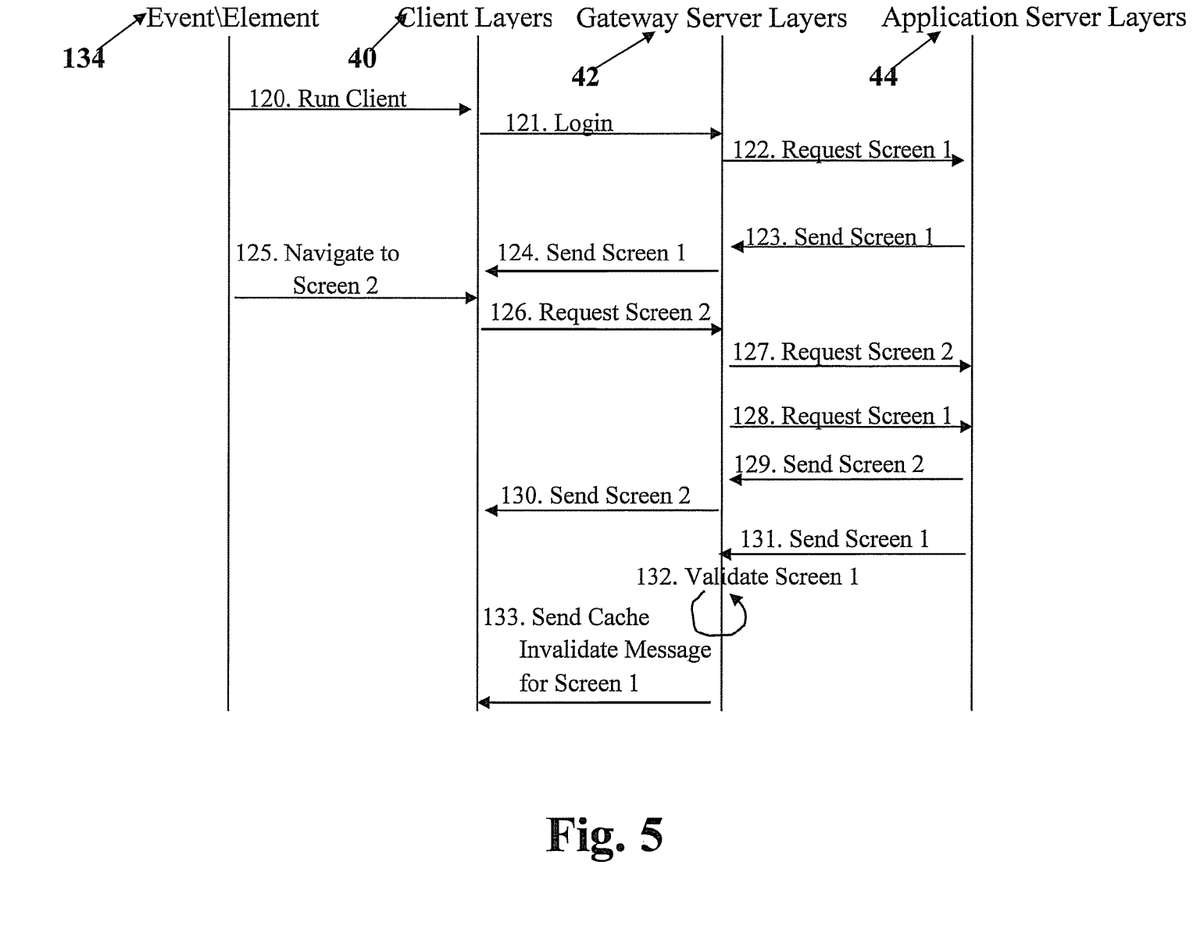
FIG. 5 is a flow chart of a process for using the plurality of distributed caches of FIG. 4 according to an embodiment of the invention.

Reference is made to FIG. 5, which is a flow chart of a process for using the plurality of distributed caches of FIG. 4 according to an embodiment of the invention. The process includes operations executed by events/elements 134 (e.g., provided by operation of input controls in a mobile device by a user), client layers 40, gateway server layers 42, and application server layers 44. The process describes, in one embodiment, gateway server layers 42 updating proxy remote cache 80 and client layers 40 updating local cache memory 78, in parallel, e.g., to remove invalid cache entry that take up memory on the mobile device.

In operation 120, events/elements 134 may run/operate a client. For example, events/elements 134 may include turning on a mobile device in which the client is installed, selecting a program that uses the client, connecting to a network (e.g., the Internet), or directly selecting to run the client.

In operation 121, client layers 40 may connect to gateway server layers 42. For example, the client may log-in (e.g., according to operation 106 of FIG. 2B). For example, client layers 40 may authenticate or send an identifier, such as, a password, code, or encrypted key.

In operation 122, gateway server layers 42 may request data from application server layers 44. The requested data may include, e.g., a screen 1, including screen 1 elements such as data, graphics, etc.

In operation 123, application server layers 44 may send screen 1 to gateway server layers 42. Gateway server layers 42 may store screen 1 in proxy remote cache 80 (e.g., a copy of local cache memory 78). Gateway server layers 42 may process screen 1 (e.g., to generate metadata and/or statistics related to screen 1 elements).

In operation 124, gateway server layers 42 may send screen 1 to client layers 40. Client layers 40 may store screen 1 in local cache memory 78.

In operation 125, events/elements 134 may select a link to screen 2 of the application.

In operation 126, client layers 40 may request screen 2 from gateway server layers 42.

In operation 127, gateway server layers 42 may request screen 2 from application server layers 44.

In operation 128, gateway server layers 42 may request screen 1 (for the second time) from application server layers 44 to check if the cache entry corresponding thereto is still valid.

In operation 129, application server layers 44 may send screen 2 to gateway server layers 42. Gateway server layers 42 may store screen 2 in proxy remote cache 80. Gateway server layers 42 may process screen 2 (e.g., to generate metadata and/or statistics related to screen 2 elements).

In operation 130, gateway server layers 42 may send screen 2 to client layers 40. The client may store screen 2 in local cache memory 78.

In operation 131, application server layers 44 may send screen 1 to gateway server layers 42.

In operation 132, gateway server layers 42 may compare the screen 1 data stored in proxy remote cache 80 in operation 123 with the screen 1 data sent in operation 131. If the two data for screen 1 do not match, a process may proceed to operation 133.

In operation 133, gateway server layers 42 may report to client layers 40 to delete the entry in local cache memory 78 for which the entry, stored in proxy remote cache 80 in operation 123, is a copy.

If the two data compared in operation 132 match, no further action is required. Alternatively, gateway server layers 42 may report a confirmation signal to client layers 40 to validate the entry in local cache memory 78 for which the entry, stored in proxy remote cache 80 in operation 123, is a copy.

Reference is made to FIG. 6, which is a flow chart of signal traffic for communicating between a mobile device and a gateway server according to an embodiment of the invention. Signals from the mobile device may be sent via client layers 40 and signals from the gateway server may be sent via gateway server layers 42. Client layers 40 and gateway server layers 42 connect over a network (e.g., network 8 of FIG. 1) over which the signals may be sent.

The communication may be bi-directional, i.e., some signals are initiated by client layers 40 and other signal are initiated by gateway server layers 42. However, in this embodiment, only client layers 40 can initiate a connection. For example, gateway server layers 42 can only respond once client layers 40 have initiated a request. The connection may be adapted for using HTTP.

In operation 136, client layers 40 may request to connect to gateway server layers 42 (e.g., using an HTTP connection). For example, client layers 40 may send authenticate or an identifier, such as, a password, code, or encrypted key.

In operation 137, in response to the request, gateway server layers 42 may send a session identification (ID) to client layers 40 to use each time the client initiates a connection. In future communications from client layers 40 to gateway server layers 42, client layers 40 may use the session ID instead of repeatedly sending authenticate or identifiers for each communication.

In operation 138, client layers 40 may send an empty request (e.g., including no request for content) to gateway server layers 42. Gateway server layers 42 do not typically respond to this request until it has content to send. For example, after some idle time has passed, and gateway server layers 42 have content to send data to client layers 40, a process may proceed to operation 139.

In operation 139, in response to the empty request, gateway server layers 42 may send client layers 40 content.

Client layers 40 send empty requests to gateway server layers 42, since, because in this embodiment, only client layers 40 can initiate a connection, gateway server layers 42 cannot respond unless client layers 40 first makes a request.

In operation 140, client layers 40 may initiate another empty request to allow the server to send more content.

In operation 141, to enable client layers 40 to send data to the server, a new (e.g., HTTP) connection may be made.

In operation 142, gateway server layers 42 may immediately close the prior connection opened in operation 140. Gateway server layers 42 may use the new connection initiated in operation 141 to send client layers 40 signals.

In some embodiments, some components in the network may drop idle connections after a predetermined period of time, e.g., a timeout interval. Typically, timeout intervals may be configured and/or automatically detected. In order to avoid an unexpected drop in a connection, which may interrupt or damage interim signals, gateway server layers 42 may close idle connection after the timeout interval, before the connections are otherwise dropped by other components in the network. When gateway server layers 42 close a connection, client layers 40 may initiate another empty request to substantially always keep open a connection with gateway server layers 42.

When gateway server layers 42 have multiple signals to send to client layers 40, gateway server layers 42 may combine the signals into one response (e.g., to reduce bandwidth and latency). Gateway server layers 42 may stagger or delay sending signals (e.g., by a short amount of time) to synchronize multiple signals to be combined.

In an embodiment of the invention, a device, system, and method are presented for communicating using a hypertext transfer protocol. The system may include a server (e.g., gateway server 22) for communicating (e.g., via gateway server layers 42) with one or more clients (e.g., via client layers 40) and a client installed in a mobile device (e.g., mobile devices 2, 4, and/or 6 of FIG. 1). The client may connect to the server via a network (e.g., networks 8 and/or 28 of FIG. 1) using a hypertext transfer protocol. The client may open a new connection and send a request if no connection is currently open so that the server can always send data. The client may open additional connections to send data to the server without waiting for a response a previous connection. The client and/or the server may regulate the number of concurrent open connections.

Reference is made to FIG. 7, which is a flow chart of a process for detecting if a mobile device can support two or more simultaneous connections with a gateway server according to an embodiment of the invention. The communication protocol in FIG. 7 may be combined with the communication protocol in FIG. 6 to support mobile devices which only support opening one (e.g., and no more than one) simultaneous connection. Applying the communication protocol described in FIG. 6 to such mobile device may cause communication to and/or from the mobile device to halt.

Some mobile devices may not support client layers 40 having two or more simultaneous outgoing (e.g., HTTP) connections. To establish proper bi-directional communication, it should be determined whether or not client layers 40 may have two or more simultaneous connections.

In operation 144, client layers 40 may request to connect to gateway server layers 42. For example, client layers 40 may send authenticate or an identifier, such as, a password, code, or encrypted key.

In operation 145, in response to the request, gateway server layers 42 may send a session ID to client layers 40.

In operation 146, client layers 40 may send an empty request to gateway server layers 42. Gateway server layers 42 typically do not respond to this request until it has some content to send.

In operation 147, after some idle time has passed, client layers 40 may request another connection with gateway server layers 42. Client layers 40 may send Gateway server layers 42 data. At this time, the client may start a timer.

If client layers 40 cannot have two or more simultaneous connections, the second connection may wait until the first one is closed. If client layers 40 can have two or more simultaneous connections, a process may proceed according to operations(s) described in reference to FIG. 6.

In operation 148, in response to the empty request, gateway server layers 42 may send client layers 40 content. When client layers 40 receive this response, client layers 40 may check the timer started in operation 147.

If the timer count is greater than a predetermined time, e.g., determined by network latency and/or CPU time, it may be determined that gateway server layers 42 did not receive the second request for the second connection (e.g. requested in operation 147) until the gateway server had some timeout on the first connection or had information to send to client. Therefore, client layers 40 cannot have two or more simultaneous connections. If client layers 40 can have two simultaneous connection, gateway server layers 42 would have closed the first connection immediately after the request for the second connection (e.g., after some network latency) as it has done in operation 142 in FIG. 6.

If the timer count is less than the predetermined time, it may be indeterminate whether or not client layers 40 can have two or more simultaneous connections. The communication may continue normally until at later time, e.g., when gateway server layers 42 detect two simultaneous open connections and stops the timer logic or if gateway server layers 42 never detect two simultaneous connections, the timer eventually detects the lack of support.

Once the result is determined, client layers 40 and/or gateway server layers 42 may store the result, e.g., to avoid re-testing.

The following describes a process for detecting that a connection, which is reported to enable client layers 40 to send multiple signals in succession over the same connection (e.g., HTTP1.1), instead only supports sending one signal for each connection (e.g., HTTP 1.0).

HTTP 1.1 may enable client layers 40 to send multiple signals using the same connection. HTTP 1.0 does not enable client layers 40 to send multiple signals using the same connection. Instead, HTTP 1.0 opens a new connection for every request from client layers 40. When client layers 40 report supporting HTTP 1.1 when actually supporting HTTP 1.0, many new connections may be unknowingly opened. The multitude of new connections may exhaust client layers 40 resources.

To prevent this, gateway server layers 42 may count connections and requests, e.g., as well as time intervals between requests. If, over a predefined period of time or upon reaching a predefined count of requests, gateway server layers 42 detect that the number of connections is equal to the number of requests and that the time between consecutive requests is below a predetermined threshold, gateway server layers 42 may conclude that client layers 40 support HTTP 1.1. If the server determines that HTTP 1.1 cannot be used, the server closes each connection immediately after using it to send a response. Thus, gateway server layers 42 may release client layers 40 resources from the entanglement of the multitude of open connections by force closing each connection after sending a response to client layers 40.

In an embodiment where both client layers 40 and gateway server layers 42 support HTTP1.1, but the connection passes through a proxy or gateway that does not support HTTP1.1, e.g., but only HTTP1.0, gateway server layers 42 may likewise close the connections to avoid unexpected connection drops.

In an embodiment of the invention, a device, system, and method are presented for determining whether or not a client can have two or more simultaneous connections using a hypertext transfer protocol. The system may include a server (e.g., gateway server 22) for communicating (e.g., via client layers 40) with one or more clients (e.g., via client layers 40) and a client installed in a mobile device (e.g., mobile devices 2, 4, and/or 6 of FIG. 1). The client may connect to the server via a network (e.g., networks 8 and/or 28 of FIG. 1) using a hypertext transfer protocol. The client may open a first connection, initiate a timer count, and open a concurrent second connection. The server may receive the first connection, and respond to the first connection only after the second connection is opened. The client may check the timer count at the time of receiving the response to the first connection. If the timer count exceeds a predefined threshold, the client may determine that two or more concurrent connections cannot be supported.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A system comprising:
a client executing on a mobile device that connects to a server via a network using a hypertext transfer protocol, the server configured to communicate with clients using the hypertext transfer protocol such a connection between the server and a client may only be initiated by the client, the client configured to:
  initiate a first connection with the server if no connection is currently open, the client configured to not request data over the first connection; and
  identify data to be transmitted to the server;
  initiate a second connection with the server without waiting for a response from the server over the first connection;
  transmit the identified data to the server over the second connection;
  measure an amount of time between the transmitting of the identified data and a response to the transmitted data from the server;
  responsive to the measured amount of time being more than a threshold amount of time associated with a timeout of the first connection at the server, determine that the client cannot have more than one simultaneous connection with the server; and
  responsive to the measured amount of time being less than the threshold amount of time, determine that the client can have two simultaneous connections with the server.

2. The system of claim 1, wherein the server is configured to close idle connections after a timeout interval, and wherein the client is further configured to request an additional connection with the server in response to the server closing an idle connection.

3. The system of claim 1, wherein the client measures the amount of time by starting a client timer upon initiating the second connection and checking the client timer upon receiving the response.

4. The system of claim 1, wherein the client is determined not to support the hypertext transfer protocol HTTP 1.1 in response to determining that the client cannot have more than one simultaneous connections with the server.

5. The system of claim 4, wherein the server is configured to close each connection immediately after using the connection to send a response to the client.

6. The system of claim 1, wherein the server is configured to:
count the total number of connections open with the server and requests received by the server over a predefined period of time or upon reaching a predefined count of requests; and
determine that the client supports the hypertext transfer protocol HTTP 1.1 in response to the number of open connections being equal to the number of requests received and the average time between consecutive requests being below a predetermined threshold.

7. The system of claim 1, wherein the client transmits device parameters describing one or more configurations of the mobile device over the second connection, and wherein the server is configured to adapt content according to the device parameters and transmit the adapted content to the client over the second connection.

8. The system of claim 7, wherein the server is configured to transmit device-specific commands to the client over the second connection, the device-specific commands selected based on the device parameters.

9. A method comprising:
initiating, at a client, a first connection with a server if no connection with the server is currently open, the client configured to not request data over the first connection;
identifying data to be transmitted to the server;
initiating a second connection with the server without waiting for a response from the server over the first connection;
transmitting the identified data to the server over the second connection;
measuring an amount of time between the transmitting of the identified data and a response to the transmitted data from the server;
responsive to the measured amount of time being more than a threshold amount of time associated with a timeout of the first connection at the server, determining that the client cannot have more than one simultaneous connection with the server; and
responsive to the measured amount of time being less than the threshold amount of time, determining that the client can have two simultaneous connections with the server.

10. The method of claim 9, further comprising:
transmitting device parameters describing one or more configurations of the client over the second connection;
receiving content adapted according to the device parameters from the server.

11. The method of claim 10, further comprising receiving device-specific commands from the server over the second connection, the device-specific commands associated with the device parameters.

12. The method of claim 9, further comprising, in response to determining that the server has closed the second connection due to the second connection being idle, requesting an additional connection with the server.

13. The method of claim 9, wherein measuring the amount of time comprises starting a client timer upon initiating the second connection and checking the client timer upon receiving the response.

14. The method of claim 4, further comprising determining that the client does not support the hypertext transfer protocol HTTP 1.1 in response to determining that the client cannot have more than one simultaneous connections with the server.

* * * * *